(12) United States Patent
Bartels

(10) Patent No.: US 7,987,219 B2
(45) Date of Patent: Jul. 26, 2011

(54) INCREMENTAL UMBRELLA SAMPLING

(76) Inventor: Christian Bartels, Allschwil (CH)

(*) Notice: Subject to any disclaimer, the term of this patent is extended or adjusted under 35 U.S.C. 154(b) by 1398 days.

(21) Appl. No.: 10/524,191

(22) PCT Filed: Aug. 14, 2003

(86) PCT No.: PCT/CH03/00548
§ 371 (c)(1),
(2), (4) Date: Jun. 5, 2006

(87) PCT Pub. No.: WO2004/021208
PCT Pub. Date: Mar. 11, 2004

(65) Prior Publication Data
US 2006/0242217 A1     Oct. 26, 2006

(30) Foreign Application Priority Data
Aug. 27, 2002  (EP) .................................... 02019215

(51) Int. Cl.
*G06F 1/02* (2006.01)
(52) U.S. Cl. ........................................ 708/270; 708/200
(58) Field of Classification Search .................. None
See application file for complete search history.

(56) References Cited

U.S. PATENT DOCUMENTS
5,148,365 A    9/1992  Dembo

OTHER PUBLICATIONS

Christian Bartels et al., "Multidimensional Adaptive Umbrella Sampling: Applications to Main Chain and Side Chain Peptide Conformations", Journal of computational Chemistry, vol. 18, No. 12, pp. 1450-1462, 1997.

Christian Bartels et al., "Determination of equilibrium properties of biomolecular systems using multidimensional adaptive umbrella sampling", Journal of Chemical Physics, vol. 111, No. 17, pp. 8048-8067, Nov. 1, 1999.

Tim N. Heinz et al., "Comparison of four methods to compute the dielectric permittivity of liquids from molecular dynamics simulations", Journal of chemical Physics, vol. 115, No. 3, pp. 1125-1136, Jul. 15, 2001.

*Primary Examiner* — Lewis A Bullock, Jr.
*Assistant Examiner* — Michael Yaary
(74) *Attorney, Agent, or Firm* — Harness, Dickey & Pierce, P.L.C.

(57) ABSTRACT

The present invention is an incremental umbrella sampling method to improve the performance of established sampling methods. It is sampling the state space by iteratively generating states $x_{i,t}$ and their weighting factors represented by Formula (a) by fitting the sampling distribution function $\rho_j(x)$ of the next iteration to at least one weighted property of the already sampled states. This means that $\rho_j(x)$ is fitted to the product represented by Formula (b), in which Formula (a) is the weighting factor and $O(x_{i,t})$ is a function respectively a property of the states $x_{i,t}$. The number of states $x_{i,t}$ and the number of weighting factors (see Formula (a)) is incremented with each iteration. In order to have a consistent set of weighting factors (see Formula (a)), the weighting factors are recalculated in each iteration for all, respectively for a set of selected, states. By fitting $\rho_j(x)$ in the state space it is possible to use all the information of Formula (a) and $O(x_{i,t})$ for the states $x_{i,t}$ generated so far. The fitting step allows to use different fitting strategies. For example the fitting can bias the sampling away from areas where intensive sampling has been done in the preceding iterations, or the sampling can be directed along local gradients respectively towards local minima or maxima of one or several weighted properties. In each of the iterations, the sampling distribution function is fitted in a way to improve the overall sampling of the state space. The method supports multi-objective optimizations. State space integrals can be solved. It reduces the probability that the system is trapped. The invention is general. It can be used with different sampling methods, in particular with Monte Carlo sampling, Metropolis Monte Carlo sampling, or dynamic simulations. It can be combined with the concepts of simulated annealing and multicanonical sampling. It provides a general framework that can be adapted to the system and the observables of interest.

18 Claims, 5 Drawing Sheets

INCREMENTAL UMBRELLA SAMPLING

FIELD OF THE INVENTION

Identifying one or a few states with desired properties, and averaging properties over all states of a system, can provide solutions to many important problems including determinations of binding free energies of drug candidates, protein structure predictions, analysis of experimental data, determinations of the value at risk of financial portfolios, or option pricing. Sampling algorithms such as Monte Carlo sampling, Metropolis Monte Carlo sampling, or dynamic simulations are general methods to address complex optimisation problems and to solve state space integrals. The problem with sampling algorithms is that the number of states required to obtain converged results is often large, and sometimes prohibitively large. The systems studied with sampling algorithms have, in general, a large number of states x with probabilities or probability densities that are known at least up to a normalisation constant. Examples are molecular systems, where x may denote the co-ordinates of the atoms, or financial systems, where x may be a vector of risk factors such as interest rates or stock indices.

For such systems, the average $<O_k>$ of a property $O_k(x)$ can be calculated with Eq. (1), if there is a continuum of states, i.e., $$<O_k> = \int \rho(x) O_k(x) dx \quad (1)$$

In Eq. (1), the integral is over the entire state space, $\rho(x)$ is the probability density that the system is in state x, and the index k may be used to distinguish different properties. Similar, if the states are discrete, sums $$\langle O_k \rangle = \sum_j p_j O_k(x_j) \quad (2)$$

over all states must be calculated where $p_j$ is the probability of the system to be in state $x_j$. Generalisations to other cases are possible.

An example is the estimation of the average distance between two atoms of a molecular system. The average distance $<R>$ is equal to the integral $$<R> = \int dx \rho(x) R(x) \quad (3)$$

over all conformations of the system. In Eq. (3), x is the vector of all co-ordinates of the system, $\rho(x)$ denotes the probability distribution of the system, i.e., $\rho(x)$ is equal to the probability density that the system has co-ordinates x, and $R(x)$ is the distance between the two atoms of interest as a function of the co-ordinates of the system.

The identification of some states with desired properties is a special case of a state space integral. E.g., the identification of the state $x_{min}$ that corresponds to the unique global minimum of some function $f(x)$ that has a unique global minimum is equal to solving the integral $$x_{min} = \int dx \delta\left(f(x), \min_{x_t}(f(x_t))\right) x. \quad (4)$$

In Eq. (4), $$\min_{x'}(f(x'))$$

denotes the unique global minimum of the function $f(x)$.

PRIOR ART

For many problems of interest, the integrals (Eq. 1) or sums (Eq. 2) cannot be solved analytically, and sampling algorithms have to be used to estimate the properties. Sampling algorithms produce a sample of states such that estimates of the integral of Eq. (1) or the sum of Eq. (2) are obtained as a weighted sum over the states of the sample, i.e., $$\tilde{O}_k = \sum_{t=1}^{N_t} \tilde{\rho}_{i,t} O_k(x_{i,t}). \quad (5)$$

In Eq. (5), $\tilde{O}_k$ denotes the estimate of the average $<O_k>$ of the property $O_k(x)$, $\tilde{\rho}_{i,t}$ is the weight of the state $x_{i,t}$, the sum is over the $N_i$ states produced by the sampling algorithm, the index t distinguishes different states, the index k can be used to distinguish different properties, and the index i can be used to distinguish different runs of the sampling algorithm.

Established sampling methods include systematic search methods and random sampling methods. Systematic methods, evaluate the properties of the system for a set of states determined in advance by a deterministic algorithm. Each state produced represents a subset of all states of the system. The weight $\tilde{\rho}_{i,t}$ used in Eq. (5) for state $x_{i,t}$ is proportional to the size of the subset represented by the state $x_{i,t}$. Systematic search is often used to estimate low dimensional integrals, and improvements of the simple method just described are known and applied routinely, e.g., trapezoidal interpolation. However, there are cases where prohibitively large sets of states are required to obtain converged estimates from systematic searches, e.g., for systems with a large number of degrees of freedom.

Random sampling methods generate random states $x_{i,t}$ distributed according to a sampling distribution function. For each state considered in run i, the weight $\tilde{\rho}_{i,t}$ for Eq. (5) can be determined, e.g., by Maximum Likelihood considerations (Christian Bartels "Analysing biased Monte Carlo and molecular dynamics simulations", *Chem. Phys. Lett.* 331 (2000) 446-454; see also M. Souaille and B. Roux, "Extension to the Weighted Histogram Analysis Method: Combining Umbrella Sampling with Free Energy Calculations", *Comput. Phys. Comm.* 135, (2001) 40-57; Charles J. Geyer, "Estimating normalizing constants and reweighting mixtures in Markov chain Monte Carlo", Tech. Rep. 568r (1994), School of Statistics, University of Minnesota; Art B. Owen and Yi Zhou, "Safe and effective importance sampling", *Journal of the American Statistical Association* 95 (2000) 135-; A. M. Ferrenberg and R. H. Swendsen, "Optimized Monte Carlo Data Analysis", *Phys. Rev. Lett.* 63, (1989) 1195-). The weights depend on the sampling distribution functions used. Different random sampling methods such as Monte Carlo, Metropolis Monte Carlo, or Langevin Molecular Dynamics differ in the way the states are generated. In Monte Carlo sampling—for example according to U.S. Pat. No. 6,061,662—states are generated independently of each other. Metropolis Monte Carlo generates new states by perturbing existing states and accepting or rejecting them such that the states are sampled according to a given sampling distribution function.

With the mentioned sampling algorithms, it is in principle possible to estimate properties of arbitrary systems. However, in many cases, the size of the sample required to obtain converged estimates is large, and calculation times get prohibitively long. The convergence of the sampling algorithm depends critically on the sampling distribution function, which is used.

For many systems and properties of interest, the best choice of the sampling distribution function is the distribution function of the system $\rho(x)$. This choice of the sampling distribution function is often optimal to estimate the equilibrium properties of the system. The weighting factors $\tilde{\rho}_{i,t}$ of Eq. (5) are all equal to $N_i^{-1}$ where $N_i$ is the number of states of the sample. In other words, estimates of the equilibrium properties of the system are equal to the average of the properties of the states sampled. There are cases where the distribution function of the system is not the optimal choice. Examples are the estimation of properties dominated by the contribution of a few rare states (e.g., the estimation of the probability of a molecular system to be in a transition state region, or the value at risk of a financial portfolio), or systems that consist of several sub-regions and where the sampling gets trapped in one of the sub-regions (e.g., simulations of molecular systems, in general, and identification of binding modes of drug-protein complexes, in particular).

The terms "Importance Sampling" and "Umbrella Sampling" refer to sampling algorithms that use a sampling distribution function different from the distribution function of the system (M. P. Allen and D. J. Tildesley, "Computer Simulation of Liquids", Clarendon Press, Oxford (1987)). These methods are based on the facts that the distribution function of the system is not always the optimal sampling distribution function, and that properties of the unbiased system can be estimated from simulations with a sampling distribution different from the distribution function of the unbiased system. Importance sampling is a general concept. The concept does not say which kind of sampling distribution function to use. For complex systems with a large number of states, defining appropriate sampling distribution function is very difficult.

U.S. Pat. No. 6,381,586 describes a method to get rapid convergence of the estimate of the price of an option. The method is based on an appropriate selection of the importance sampling distribution function. The method relies on the fact that states that contribute to the estimate are concentrated in a sub-region of the state space, and that this sub-region can be identified before starting the simulations. If these conditions are fulfilled, convergence of the estimate can be increase by identifying the subregion, and by defining a sampling distribution function that biases sampling into the identified sub-region. This situation is quite particular to the problem considered, and the same approach is not applicable, for example, for the determination of the value of risk of an option portfolio. In many applications it is not possible to identify such a sub-region before starting the simulation. Defining a wrong sub-region would cause the simulation to be trapped within said sub-region and slow down convergence of estimates.

U.S. Pat. No. 6,178,384 describes a sampling method to estimate conformational free energies. The method is based upon an appropriate definition of the sampling distribution functions. The method assumes that regions that contribute to the estimates are approximately harmonic, and that the centres of these regions are known. Using these assumptions, a series of Monte Carlo simulations is carried out. Each of the simulations samples one of the identified regions using a sampling distribution function equal to the corresponding harmonic potential. The method is difficult to apply, if the system cannot be described as a sum of approximately harmonic wells, if there is a large number of harmonic wells that contribute to the estimates, or if the wells cannot be identified. For example, molecular systems in explicit water consist of a very large number of wells, or the dominant local minima of proteins are difficult to identify without experimental data.

Defining sampling distribution function to improve the convergence of the estimates requires some knowledge of the system. For most systems of interest, this knowledge is not available a priori, and must be acquired somehow. One possibility is to carry through preliminary studies, for example, minimization as is proposed in the patents U.S. Pat. Nos. 6,178,384 B1 and 6,381,586 B1. The problem is that with increasing complexity of the system (large number of local minima, many dimensions, regions of state space that contribute to the estimates are unknown) the required preliminary studies become difficult or impossible.

Instead of defining the sampling distribution function before starting the simulation, it is in many cases easier to identify a desired property of the sampling, and to iteratively adapt the sampling distribution function in order to achieve the desired property. This is the essence of what is referred to as "adaptive umbrella sampling" in the literature on molecular simulations (Christian Bartels, Michael Schaefer and Martin, Karplus "Determination of equilibrium properties of biomolecular systems using multidimensional adaptive umbrella sampling", *J. Chem. Phys.* 111, 17 (1999) 8048-8067; Bernd A. Berg and Thomas Neuhaus "Multicanonical ensemble: A new approach to simulate first-order phase transitions", *Phys. Rev. Let.* 68 (1992), 9-12). It can for example be assumed that the property of interest is the probability distribution of a selected degree of freedom (probability distribution of the distance between two atoms, probability distribution of future gains of a financial institution, . . . ). Estimates of such a distribution require that all values of the degree of freedom are sampled. Thus, it makes sense to adapt the sampling distribution function such that all values of interest of the degree of freedom are sampled with comparable probabilities. A problem with adaptive umbrella sampling is that even if the desired umbrella potential is determined, it will in general not be possible to ensure that transitions between different important regions of the system occur and that the system does not get trapped.

SUMMARY OF THE INVENTION

The present invention is a method to improve the performance of established sampling methods. The new method can be called incremental umbrella sampling. Incremental umbrella sampling defines a method for sampling the state space by iteratively generating states $x_{i,t}$ and their weighting factors $\tilde{\rho}_{i,t}$ by fitting the sampling distribution function $\rho_j(x)$ of the next iteration to at least one weighted property of the already sampled states. This means that $\rho_j(x)$ is fitted to the product $\tilde{\rho}_{i,t}O(x_{i,t})$, in which the $\tilde{\rho}_{i,t}$ are the weighting factors and $O(x_{i,t})$ is a function respectively a property of the states $x_{i,t}$.

In a first step an initial sampling distribution function $\rho_i(x)$ is selected. If necessary, other starting parameters are selected as well, for example a starting state. The iteration parameter j is set equal to a starting value, preferably to 1. The iteration process consists of a second, a third, a fitting and a fourth step which are repeated until at least one criterion is fulfilled. In the second step $N_j$ states $x_{j,t}$ are generated by a numerical sampling algorithm that samples states according to the sampling distribution function $\rho_j(x)$. The third step determines weighting factors $\tilde{\rho}_{i,t}$ for states $x_{i,t}$ generated so far, which means for states $x_{i,t}$ with i≦j (the index i distinguishes different previous simulations, and the index t distinguishes different states of each simulation). The weighting factors $\tilde{\rho}_{i,t}$ are determined by using the sampling distribution functions $\rho_i(x)$ used so far, respectively with i≦j. The number of states $x_{i,t}$ and the number of weighting factors $\tilde{\rho}_{i,t}$ can be incremented with each iteration. For reasons of insufficient memory it can be necessary to discard some of the states. In order to have a consistent set of weighting factors $\tilde{\rho}_{i,t}$ the weighting factors are calculated in each iteration for all, respectively for a set of selected, states. At least for normalized weighting factors $\tilde{\rho}_{i,t}$ the weighting factors $\tilde{\rho}_{i,t}$ of iterations with i<j (earlier iterations) will be altered by the newest iteration, respectively by the fact that the total number of selected states is increased. The iteration parameter j is incremented preferably by 1. The fitting step determines a sampling distribution function $\rho_j(x)$ by fitting $\rho_j(x)$ to $\tilde{\rho}_{i,t}O(x_{i,t})$ for states $x_{i,t}$ generated so far. The fitting can be done at all or at selected states $x_{i,t}$. In the fourth step at least one criterion is tested, for example the number of iterations. In many cases good results can be found if at least three iterations are done. According to the result of the test it will be decided whether to continue the iteration with the second or to go to a fifth step in order to perform an analysis. The forth step could as well be executed directly after the third step. In this case the iteration would be continued by the fitting step and then by the second step.

By fitting $\rho_j(x)$ in the state space it is possible to use all the information of $\tilde{\rho}_{i,t}$ and $O(x_{i,t})$ for the states $x_{i,t}$ generated so far. The fitting step allows to use different fitting strategies. For example the fitting can bias the sampling away from areas where intensive sampling has been done in the preceding iterations, or the sampling can be directed along local gradients respectively towards local minima or maxima of one or several weighted properties. In each of the iterations, the sampling distribution function is fitted in a way to improve the overall sampling of the state space. For example each fitted sampling distribution function will direct the sampling to regions that contribute significantly to the estimates of interest and that were little sampled so far. For a given region of the state space the fitted sampling distribution is different if there is a large number of states with small weighting factors or if there are a few states with large weighting factors. In contrast, with adaptive umbrella sampling methods and other methods that are based on estimating some properties of the sampling distribution function with Eq. 5, the two situations would result in comparable sampling distribution functions.

Adaptive umbrella sampling attempts to come up with a single sampling distribution function that should ensure sampling of all the important states. Incremental umbrella sampling creates for each iteration a sampling distribution function to improve the overall sampling. Since incremental umbrella sampling avoids re-sampling of regions that were already extensively sampled and directs sampling to regions that were relatively little sampled, incremental umbrella sampling is more efficient than adaptive umbrella sampling.

The inventive method reduces the number of states that need to be sampled to identify the states of interest, or to obtain converged estimates of the state space integrals. Compared to simulated annealing (S. Kirkpatrick, C. D. Gelatt Jr., M. P. Veochi, "Optimization by Simulated Annealing", *Science*, 220, 4598, (1983) 671-680) and multicanonical sampling (Bernd A. Berg and Thomas Neuhaus "Multicanonical ensemble: A new approach to simulate first-order phase transitions", *Phys. Rev. Let.* 68 (1992), 9-12) the invention has several advantages. The probability of the identified optimal state can be estimated. It supports multi-objective optimisations. State space integrals can be solved. It reduces the probability that the system is trapped. The invention is general. It can be used with different sampling methods, in particular with Monte Carlo sampling, Metropolis Monte Carlo sampling, or dynamic simulations. It can be combined with the concepts of simulated annealing and multicanonical sampling. It provides a general framework that can be adapted to the system and the observables of interest.

A special embodiment uses in at least one iteration a numerical sampling algorithm which generates correlated states $x_{j,t}$, wherein the sampling distribution function $\rho_j(x)$ preferably has a maximum that biases sampling into a sub-region of the state space, wherein the sampling distribution function $\rho_j(x)$ is preferably fitted such that the maximum is in a region where the product $\tilde{\rho}_{i,t}O(x_{i,t})$ has a maximum, and wherein the sampling preferably starts from a state dose to the maximum of the sampling distribution function $\rho_j(x)$.

The inventive method is preferably commercialized in the form of a computer software product on a computer-readable medium in which program instructions are stored, which instructions, when read by a computer, enable the computer to apply the inventive method.

DETAILED DESCRIPTION OF THE PREFERRED EMBODIMENTS

Figure 1:
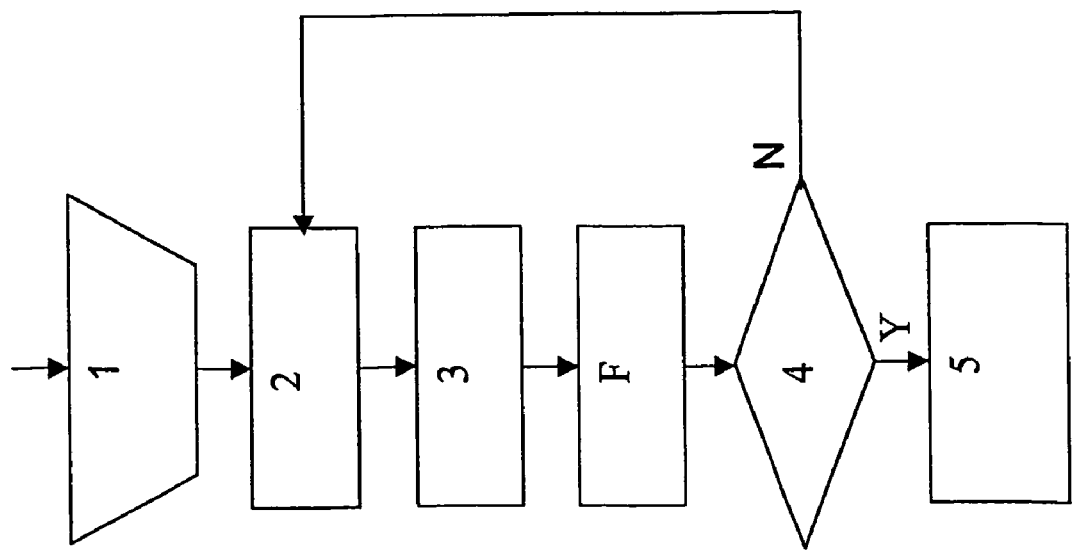
FIG. 1. is a flow chart of an iterative umbrella sampling simulation.

Exploration of the state space proceeds in a series of steps shown in FIG. 1. In a first step 1 an initial sampling distribution function $\rho_1(x)$ is selected. If necessary other starting parameters are selected as well, for example a starting state.

This is often an interactive step. Computational tools may be used. The iteration parameter j is set equal to 1. The iteration consists of a second 2, a third 3, a fitting F and a fourth step 4 which are repeated until at least one criterion is fulfilled. In the second step $N_j$ states $x_{j,t}$ with t=1,2, ..., $N_j$ are generated by a numerical sampling algorithm. In the third step 3 the weighting factors $\tilde{\rho}_{i,t}$ are deduced from the sampling distribution functions $\rho_1(x)$ for states $x_{i,t}$ generated so far, which means for states $x_{i,t}$ with i≦j. The third step 3 increments j by 1. The fitting step F determines the sampling distribution function $\rho_j(x)$ for the next iteration by fitting $\rho_j(x)$ to $\tilde{\rho}_{i,t} O(x_{i,t})$ for states $x_{i,t}$ generated so far. In the fourth step 4 at least one criterion is tested. For example the criterion can be the convergence of the simulations or reaching a given number of iterations. The criterion may involve some interactive steps. According to the result N or Y of the fourth step 4 it will be decided whether to continue (N) the iteration with the second step 2 or to go (Y) to a fifth step 5 in order to perform the final analysis. The simulations, respectively the states $x_{j,t}$ with the weighting factors $\tilde{\rho}_{i,t}$, are analysed to obtain the estimates of interest. An analysis based on Eq. (5) is convenient, as it provides a general and consistent way to obtain estimates of equilibrium properties.

The initial conditions should be selected such that the simulation reaches rapidly equilibrium. This is necessary for the sample to represent the sampling distribution function. If a Metropolis Monte Carlo algorithm or a molecular dynamics simulation is used, the starting state and the initial sampling distribution function should be selected such that the starting state has a high probability of being sampled with the selected sampling distribution function. If a Monte Carlo algorithm is used that produces sates independently of any starting state, selection of a starting state is evidently not required.

A simulation is carried out with the selected sampling distribution function $\rho_j(x)$. The simulation must produce a sample consisting of $N_j$ states $x_{j,t}$ distributed according to the sampling distribution function $p_j(x)$.

Different simulation algorithms may be used, for example Monte Carlo, Metropolis Monte Carlo, Molecular Dynamics algorithms. The choice will depend on the system to be studied and the selected sampling distribution function. For reference in later sections, some possibilities are listed here
a) Monte Carlo Method: States are generated independently of each other by transforming random numbers generated by a random number generator. The resulting states are un-correlated.
b) Metropolis Monte Carlo, Version 1: A trial state $x_{trial}$ is generated from an existing state $x_{j,t}$ such that the probability of generating $x_{trial}$ from $x_{j,t}$ is equal to the probability of generating $x_{j,t}$ from $x_{trial}$. The trial state is accepted with $$\text{probability } 1, \text{ if } \rho_i(x_{trial}) \geq \rho_i(x_{j,t}) \tag{6A}$$

$$\text{probability } \rho_i(x_{trial})/\rho_i(x_{j,t}) \text{ if } \rho_i(x_{trial}) < \rho_i(x_{j,t}) \tag{6B}$$

If $x_{trial}$ is accepted, it is taken as the new state $x_{j,t+1} = x_{trial}$, otherwise $x_{j,t}$ is taken as the new state $x_{j,t+1} = x_{j,t}$.
c) Metropolis Monte Carlo, Version 2: Using a Monte Carlo algorithm that produces states distributed according to $\rho_{simple}(x)$, a trial state $x_{trial}$ is generated independently of any other state. The trial state is accepted with $$\text{probability } 1, \text{ if } \frac{\rho_i(x_{trial})}{\rho_{simple}(x_{trial})} \geq \frac{\rho_i(x_{j,t})}{\rho_{simple}(x_{j,t})} \tag{7A}$$

$$\text{probability, } \frac{\rho_i(x_{trial})\rho_{simple}(x_{j,t})}{\rho_{simple}(x_{trial})\rho_i(x_{j,t})} \text{ if } \frac{\rho_i(x_{trial})}{\rho_{simple}(x_{trial})} < \frac{\rho_i(x_{j,t})}{\rho_{simple}(x_{j,t})} \tag{7B}$$

If $x_{trial}$ is accepted, it is taken as the new state $x_{j,t+1} = x_{trial}$, otherwise $x_{j,t}$ is taken as the new state $x_{j,t+1} = x_{j,t}$.

New sampling methods are still being developed. U.S. Pat. No. 5,740,072 describes a sampling method that combines the Metropolis Monte Carlo method with stochastic dynamics.

Optimal Weighting Factors

Optimal weighting factors can be obtained with Equations (8-11). Equations (8) and (9) express the weighting factors $\tilde{\rho}_{i,t}^{self}$ in function of the normalisation constants $\tilde{f}_k^{self}$, and vice versa.

$$\tilde{\rho}_{i,t}^{self} = \left( \sum_{k=1}^{N_{sim}} N_k \tilde{f}_k^{self} C_k(x_{i,t}) \right)^{-1} \tag{8}$$

$$\tilde{f}_k^{self} = \left( \sum_{i=1}^{N_{sim}} \sum_{t=1}^{N_t} C_k(x_{i,t}) \tilde{\rho}_{i,t}^{self} \right)^{-1} \tag{9}$$

Self-consistent estimates of the weighting factors $\tilde{\rho}_{i,t}^{self}$ and normalization constants $\tilde{f}_k^{self}$ can be obtained by applying equations (8, 9) repeatedly until the weighting factors have converged. The normalised weighting factors $\tilde{\rho}_{i,t}$ are then given by $$\tilde{\rho}_{i,t} = \tilde{\rho}_{i,t}^{self} \Big/ \sum_{k=1}^{N_{sim}} \sum_{t=1}^{N_t} \tilde{\rho}_{f,t}^{self}. \tag{10}$$

In equations (8) to (10), $N_j$ and $N_k$ are the number of states produced by simulations j and k, respectively, $N_{sim}$ is the number of simulations, and the bias functions $$c_k(x) \propto \rho_k(x)/\rho(x) \tag{11}$$

are proportional to the ratio of the sampling distribution function of the simulation divided by the distribution function of the system. It helps with the understanding of what follows to note that the weighting factors $\tilde{\rho}_{i,t}$ are proportional to $\rho(x_{i,t})/\rho_i(x_{i,t})$, if only a single simulation is analysed. If several simulations are analysed, the weighting factors can be understood as the ratio of the distribution function of the system divided by an average effective sampling distribution function that represents the sampling carried out in all of the simulations. Thus, the weighting factors are large for states, for which the distribution function of the system is large, or for which the average effective sampling distribution function is small. A necessary condition for any method to estimate the weighting factors $\tilde{\rho}_{i,t}$ to be useful in the context of the present invention is that additional sampling in the region around a selected state must reduce the weighting factor of the selected state.

For particular cases, other equations exist to determine the set of weighting factors. If the sampling distribution functions differ only along one or a few selected degrees of freedom, the Weighted Histogram Analysis Method of A. M. Ferrenberg and R. H. Swendsen, "Optimized Monte Carlo Data Analysis", *Phys. Rev. Lett.* 63, (1989) 1195- may be used. If the normalisation constants of the sampling distribution functions are known and need not to be estimated with Eq. (9), the formalisms described and referenced in Art B. Owen and Yi Zhou, "Safe and effective importance sampling", *Journal of the American Statistical Association* 95 (2000) 135- may be used.

One-Dimensional System to Illustrate the Inventive Method

A fitting procedure is used to define a sampling distribution function that directs sampling to regions that contribute significantly to the estimates of interest and that were little sampled so far. One of the advantages of the proposed method is that it can be applied to high-dimensional systems with sampling distribution functions that vary along many dimensions. The inventive method is illustrated using a one-dimensional system, e.g., two atoms separated by a distance x. The distribution function of the system of the example is equal to a normal distribution with mean 0 and standard deviation 1, i.e., $$\rho(x) = \frac{1}{\sqrt{2\pi}} e^{-x^2/2}.$$

The observable assumed to be of interest is set equal to a normal distribution with mean 2 and standard deviation 1, i.e., $$O_1(x) = \frac{1}{\sqrt{2\pi}} e^{-(x-2)^2/2}.$$

Further, it is assumed that two simulations have been carried out, and that the sampling distribution function for the third simulation should be determined, i.e., j=3.

Figure 2:
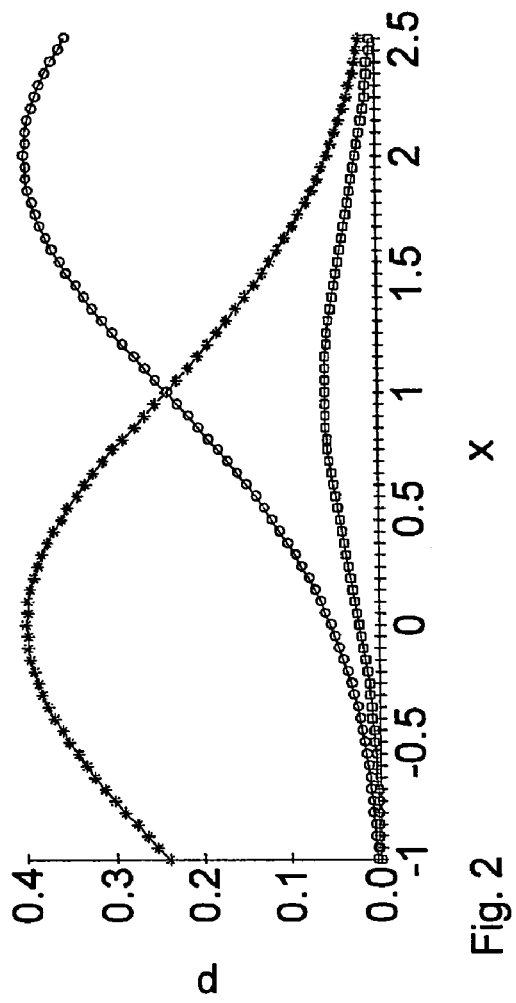
FIG. 2. shows a distribution function $\rho(x)$ (asterix), an observable $O(x)$ (circles) and a product $\rho(x)O(x)$ (rectangles) of a one-dimensional system in the form of probabilities (p) versus the dimension of the system (x).
Figure 3:
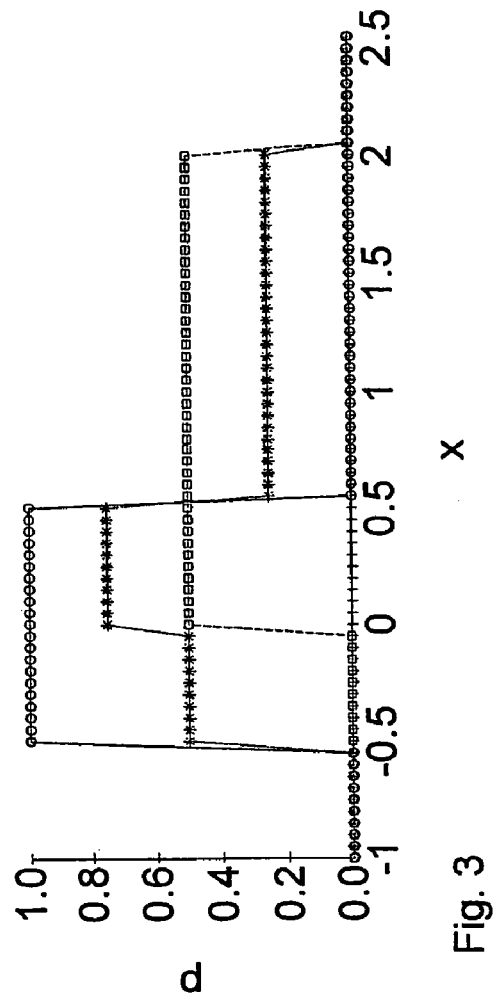
FIG. 3. shows distribution functions $\rho_1(x)$ (circles), $\rho_2(x)$ (rectangles) and $\rho_1(x)/2+\rho_2(x)/2$ (asterixes) of the one-dimensional system (p versus x).

FIG. 2 illustrates the distribution function of the system and the observable; the asterix show the distribution function $\rho(x)$, the circles the observable $O_1(x)$, and the rectangles show the product $\rho(x)O_1(x)$ used in Eq. (1). The product $\rho(x)O_1(x)$ is maximal at x=1. Thus, to calculate the average $<O_1>$ of the property $O_1(x)$, states around x=1 are most important. FIG. 3 shows the sampling distribution functions $\rho_1(x)$ as circles, $\rho_2(x)$ as rectangles, and the average $\rho_1(x)/2+\rho_2(x)/2$ as asterixes, respectively. The sampling distribution function $\rho_1(x)$ was chosen to be equal to 1 for x between −0.5 and 0.5, the sampling distribution function $\rho_2(x)$ was chosen to be equal to 0.5 for x between 0 and 2. In each of the two simulations, 30 states were sampled.

Figure 4:
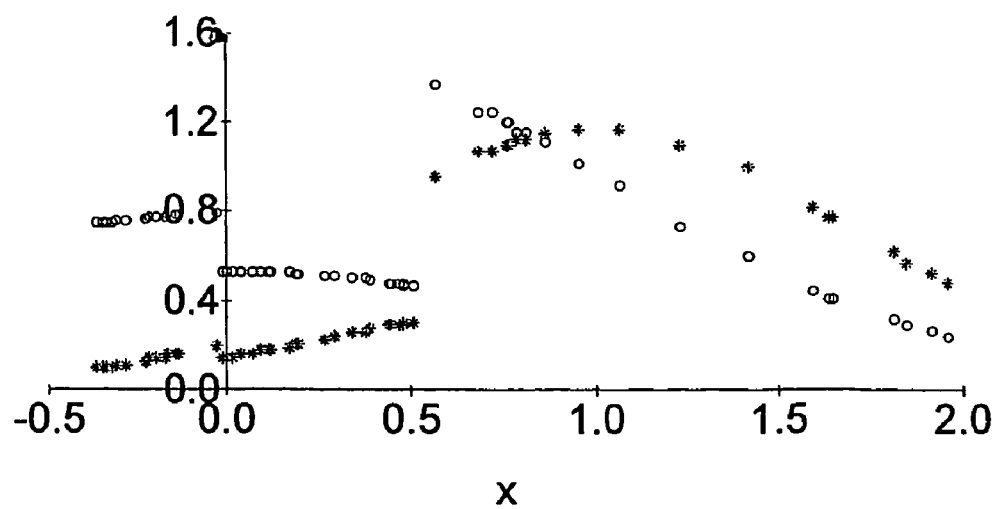
FIG. 4. shows the weighting factors $\tilde{\rho}_{i,t}$ (circles) and the product $\tilde{\rho}_{i,t}O(x_{i,t})$ (asterix) versus the states $x_{i,t}$.

FIG. 4 plots for each state $x_{i,t}$ the weighting factors $\tilde{\rho}_{i,t}$ and the product $\tilde{\rho}_{i,t}O_1(x_{i,t})$ as circles and asterixes, respectively. The sampling distribution functions are normalised. Thus, the normalisation constants need not to be estimated with Eq. (9), and the (un-normalised) weighting factors are directly given by $$\tilde{\rho}_{i,t}^{self} = \frac{\rho(x_{i,t})}{\rho_1(x_{i,t})/2 + \rho_2(x_{i,t})/2}; \quad (12)$$

They are equal to the distribution function of the system divided by the average of the sampling distribution functions of the two previous simulations.

The estimate of the average $<O_1>$ is dominated by states for which the product $\tilde{\rho}_{i,t}|O_1(x_{i,t})|$ is large (Eq. 5). From Eq. (12) and FIG. 4, it is seen that the product $\tilde{\rho}_{i,t}|O_1(x_{i,t})|$ is large for states with $\rho(x_{i,t})|O_1(x_{i,t})|$ large and $\rho_1(x_{i,t})/2+\rho_2(x_{i,t})/2$ small. $\rho(x_{i,t})|O_1(x_{i,t})|$ is large for states that contribute significantly to the average $<O_1>$ of the property $O_1(x)$ (Eq. (1) and FIG. 2). $\rho_1(x_{i,t})/2+\rho_2(x_{i,t})/2$ is small for states that are in regions that were not much sampled so far (FIG. 3). Thus, to sample states that contribute to the estimate of the average $<O_1>$ of the property $O_1(x)$, and to sample regions that were little sampled so far, sampling should be directed towards regions around states that correspond to a large value of the product $\tilde{\rho}_{i,t}|O_1(x_{i,t})|$. This can be done by fitting the sampling distribution function $\rho_3(x)$ for the next simulation to the product $\tilde{\rho}_{i,t}|O_1(x_{i,t})|$ evaluated for the states obtained from the first two simulations. The fit is done such that the resulting sampling distribution function is large for at least some states with a large value of the product $\tilde{\rho}_{i,t}|O_1(x_{i,t})|$.

Formulating this more generally: the sampling distribution function $\rho_j(x)$ for the next simulation is fitted to the product $\tilde{\rho}_{i,t}O(x_{i,t})$ of the states of all previous simulations i=1, 2, ..., j−1 times a function O(x). The fit is done such that the resulting sampling distribution function is large for at least some states with a large product $\tilde{\rho}_{i,t}O(x_{i,t})$, and tends to be small for states with a small product $\tilde{\rho}_{i,t}O(x_{i,t})$. The function O(x) is defined such that it is large for the states of interest, e.g., it is set equal to $O(x)=|O_1(x)|$.

Different strategies can be used to fit the sampling distribution function for the next iteration to the product $\tilde{\rho}_{i,t}|O_1(x_{i,t})|$ shown as asterixes in FIG. 4. A simple strategy is to identify the state with the largest value of the product $\tilde{\rho}_{i,t}|O_1(x_{i,t})|$, and to define the sampling distribution function for the next iteration such that it is large at the selected state. In the example of FIG. 4, the state with the largest value is the 16$^{th}$ state of the second simulation and is located at 1.07, i.e., $x_{2,16}$=1.07. Thus, a possible sampling distribution function for the next iteration of the example might be uniform sampling around the state at 1.07 in the range between 0.57 and 1.57. An alternative strategy would be to identify states with a small value of the product $\tilde{\rho}_{i,t}|O_1(x_{i,t})|$ and to make the sampling distribution function for the next iteration small for these states. E.g., the sampling distribution function for the next iteration of the example could be set to a uniform distribution between −0.5 and 2 but excluding the region from −1.37 to 0.63 that lies around the state at −0.37 that has the smallest value of the product $\tilde{\rho}_{i,t}|O_1(x_{i,t})|$. A third strategy would be to express the logarithm of the sampling distribution function as a linear function of some parameters and to use a linear least square fit to determine the parameters. These are only some of the possible fitting strategies. They are described in a more formal way below.

Formal Description of a Fitted Sampling Distribution Function

The sampling distribution function $\rho_j(x)$ for the next iteration is defined based on the states $x_{i,t}$ and their weighting factors $\tilde{\rho}_{i,t}$ from the previous simulations i=1,2, ..., j−1. The sampling distribution function $\rho_j(x)$ can be expressed as a function $h(v_j,x)$ of a vector $v_j$ of parameters, and the normalisation constant $f_j$, i.e., $$\rho_j(x)=\rho_j(v_j,x)=f_jh(v_j,x). \quad (13)$$

For some of the existing simulations algorithm, e.g., molecular dynamics or Metropolis Monte Carlo, the normalisation constant $f_j$ needs not to be known, and needs not to be determined. For the other simulation algorithms, it can be determined by applying the constraint that the integral of the sampling distribution function over all states must be normalised to one.

The parameters of the sampling distribution function are determined by fitting the sampling distribution function $\rho_j(x)$ to the weighting factors $\tilde{\rho}_{i,t}$ from previous simulations i∈{1, 2,...,j−1} and t∈{1,2,...,$N_i$}. The fit maximises an objective function G. The objective function G is defined as a function of local comparisons of the sampling distribution function $\rho_j(v_j,x)$ with the product $\tilde{\rho}_{i,t}O(x_{i,t})$ of the weighting factors $\tilde{\rho}_{i,t}$ times a function $O(x)$. The objective function G must be large for sampling distribution functions that are large for at least some states with a large product $\tilde{\rho}_{i,t}O(x_{i,t})$, and small for the majority of states with a small product $\tilde{\rho}_{i,t}O(x_{i,t})$. Different procedures can be used to do the fitting; examples are given below.

Objective functions G are defined as functions of local comparisons. For the purpose of the local comparison, states $\tilde{x}_{i,t}$ from the previous simulations $i=1,2,\ldots,j-1$ are associated to the weighting factors $\tilde{\rho}_{i,t}$ from previous simulations, e.g., $\tilde{x}_{i,t}=x_{i,t}$. The sampling distribution function $\rho_j(v_j,\tilde{x}_{i,t})$ at $\tilde{x}_{i,t}$ is compared to the corresponding product $\tilde{\rho}_{i,t}O(x_{i,t})$ using a local comparison function $$d_{i,t}=d(\rho_j(v_j,\tilde{x}_{i,t}),\tilde{x}_{i,t},\tilde{\rho}_{i,t}O(x_{i,t})), \quad (14)$$

e.g., $d(\rho_j(v_j,\tilde{x}_{i,t}),\tilde{x}_{i,t},\tilde{\rho}_{i,t}O(x_{i,t}))=(\ln \rho_j(v_j,\tilde{x}_{i,t})-\ln \tilde{\rho}_{i,t}O(x_{i,t}))^2$, and the objective function is defined as a function of the local comparisons, e.g., $$G = \sum_{i=1}^{N_{sim}} \sum_{t}^{N_t} d_{i,t}.$$

The form of the sampling distribution function, the set of parameters, the objective function G, the function $O(x)$, and the fitting procedure may be adapted to the system and properties of interest, as well as to the available simulation algorithms. Examples are given below.

Examples of Sampling Distribution Functions with Harmonic Constraints

Examples of sampling distribution functions can be found by applying harmonic constraints to the distribution function of the system, $$\rho_j(x)=f_j\exp(-k_{constr}(x-x_{j,constr})^2)\rho(x). \quad (15)$$

In Eq. (15), $k_{constr}$ is a constant that determines the strength of the harmonic constraint, $f_j$ is the scaling factor to normalise $\rho_j(x)$, and $x_{j,constr}$ is the centre of the constraint. The parameters that can be fitted are the centre and the strength of the constraint, $v_j=\{k_{constr},k_{j,constr}\}$. For systems consisting of many local minima separated by barriers, application of a multicanonical sampling distribution function can be advantageous, $$\rho_j(x)=f_j\exp(-k_{constr}(x-x_{j,constr})^2)\rho_{mc}(x). \quad (16)$$

In Eq. (16), $\rho_{mc}(x)$ denotes the multicanonical distribution function; the remaining parameters are identical to those of Eq. (15). In particular, the parameters that can be fitted are the centre and the strength of the constraint, $v_j=\{k_{constr},x_{j,constr}\}$.

The multicanonical distribution function $\rho_{mc}(x)$ (Bernd A. Berg and Thomas Neuhaus "Multicanonical ensemble: A new approach to simulate first-order phase transitions", *Phys. Rev. Let.* 68 (1992); Christian Bartels, Michael Schaefer and Martin Karplus "Determination of equilibrium properties of biomolecular systems using multidimensional adaptive umbrella sampling", *J. Chem. Phys.* 111, 17 (1999) 8048-8067) is determined such that different values of $\ln \rho(x)$ are sampled with comparable probability. The multicanonical distribution function can be written as $$\rho_{mc}(x)\propto\rho(x)/f_{mc}(\ln \rho(x)), \quad (17)$$

where $f_{mc}$ denotes an estimate of the probability distribution of $\ln \rho(x)$. The estimate $f_{mc}$ can be obtained from a histogram of $\ln \rho(x)$ that can be obtained from the sampled state $x_{i,t}$ and their weighting factors $\tilde{\rho}_{i,t}$ using Eq. (5).

A sum of harmonic constraints applied to the distribution function of the system results in the distribution function $$\rho_j(x) = f_j\exp\left(\sum_{l=1}^{N_{j,constr}} k_{j,i,constr}(x-x_{j,i,constr})^2\right)\rho(x). \quad (18)$$

In Eq. (18), the constants $k_{j,1,constr}$ determine the strengths of the harmonic constraints, $f_j$ is the scaling factor to normalise $\rho_j(x)$, $x_{j,1,constr}$ are the centres of the constraints, and $N_{j,constr}$ is the number of harmonic constraints. The parameters that can be fitted are the number of harmonic constraints, their centres, and their strengths, $$v_j=\{k_{j,1,constr},k_{j,2,constr}, \ldots ,x_{j,1,constr}, x_{j,2,constr},\ldots,N_{j,constr}\}.$$

Depending on the sampling distribution function $\rho_j(x)$, particular sampling methods may be more or less useful. For example, the sampling distribution functions defined by Eqs. (15) or (16) with a positive value for the constant $k_{constr}$ constrain sampling to a sub-region of the state space and are particular useful together with sampling methods such as the Metropolis Monte Carlo Version 1 or stochastic dynamics that generate correlated states. In contrast, if the sampling distribution function of Eq. (18) is used, convergence of a Metropolis Monte Carlo Version 1 algorithm may be slow, and Metropolis Monte Carlo Version 2 or Monte Carlo algorithms may be preferable.

Examples of the Function $O(x)$

Examples of the function $O(x)$ can be defined such that $\rho(x)O(x)$ is large for states that should be sampled in one of the simulations. The states that should be sampled are primarily those for which one of the $N_{prop}$ properties $\Theta=\{O_1(x),O_2(x),\ldots,O_{N_{prop}}(x)\}$ (see below and Eq. 1) is large. The function $O(x)$ is set equal to a function of the set $\Theta$ of properties, e.g., $$O(x) = \max_{k\in\{1,2,\ldots,N_{prop}\}} \frac{|O_k(x)|}{s_k} \quad (19)$$

or $$O(x) = \sum_{k=1}^{N_{prop}} \frac{|O_k(x)|}{s_k}$$

with the normalisation constant $s_k$ for each property k defined as $$s_k = \sum_{i=1}^{N_{sim}} \sum_{t=1}^{N_t} \tilde{\rho}_{i,t} O_k(x_{i,t}).$$

Similar as in umbrella sampling, three different types of properties can be distinguished that identify important states and should be included in the set $\Theta$ of properties. First, states may be important since they occur with large probability in the unbiased system ($\rho(x)$ is large). In this case, a property $O_k(x)=1$ should be added to the set $\Theta$ of properties. Second, states may be important since they contribute significantly to an average $<O_k>$ of a property $O_k(x)$ of interest in the final analysis. Such a property should be added to the set $\Theta$ of properties. Third, there may exist states that are not directly of interest but whose sampling is important to obtain converged estimates of other properties. For example, in molecular systems where one is mainly interested in low energy conformations, sampling of high-energy conformations is advantageous to ensure transitions between different regions of low energy. In this case, a function should be added to the set Θ that is large for states that need to be sampled to increase convergence of the estimates. Examples are given below.

Fitting Procedure 1: Fit to State with Large Weighting Factor

Procedure 1 fits a sampling distribution function such that it is particular large for a selected state with a large product $\tilde{\rho}_{i,t}O(x_{i,t})$. The description that follows assumes that the sampling distribution function of Eq. (16) is used, that the centre $x_{j,constr}$ of the constraint is determined by the fit, and that the value of the constant $k_{constr}$ is set to a positive value that is determined in a series of preliminary test runs. The procedure may be adapted, e.g., for other sampling distribution functions.

Based on the value of the product $\tilde{\rho}_{i,t}O(x_{i,t})$, the state $x_{sel}$ from the already sampled states is identified that has a comparatively large weighting factor. E.g., the criterion to identify the state $x_{sel}$ can be that it corresponds to the maximum $$\max_{i \in \{1,2,\ldots,N_{sim}\}} \max_{t \in \{1,2,\ldots,N_t\}} \tilde{\rho}_{i,t}O(x_{i,t}). \tag{20}$$

In Eq. (20), the maximum is taken over the previous simulations i, and over the states t generated in each of the simulations; $N_{sim}=j-1$ is the number of simulations carried out so far. The centre of the constraint is then set equal to the selected state, i.e., $x_{j,constr}=x_{sel}$. The selected state $x_{sel}$ may also be used as the starting state for the simulation of the next iteration.

The objective function that is maximised by procedure 1 is equal to $$G = \max_{i \in \{1,2,\ldots,N_{sim}\}} \max_{t \in \{1,2,\ldots,N_t\}} d_{i,t}. \tag{21}$$

with the local comparisons defined as $$d_{i,t}=d(\rho_j(v_j,\tilde{x}_{i,t}),\tilde{x}_{i,t},\tilde{\rho}_{i,t}O(x_{i,t}))=\rho_j(v_j,\tilde{x}_{i,t})/\rho_{mc}(\tilde{x}_{i,t})+\tilde{\rho}_{i,t}O(x_{i,t}), \tag{22}$$

and the states $\tilde{x}_{i,t}$ for the comparison set equal to $x_{i,t}$.

Fitting Procedure 2: Fit to States with Small Weighting Factors.

Procedure 2 fits a sampling distribution function to a state with a particular small weighting factor. The description assumes again that the sampling distribution function of Eq. (16) is used and that the centre $x_{j,constr}$ of the constraint is determined by the fit. The value of the constant $k_{constr}$ is set to a negative value that may be determined in a series of preliminary test runs. The procedure may be adapted; e.g., for other sampling distribution functions with a defined centre. A state $x_{sel}$ is selected with a small product $\tilde{\rho}_{i,t}O(x_{i,t})$, e.g., the one that corresponds to the minimum $$\min_{i \in \{1,2,\ldots,N_{sim}\}} \min_{t \in \{1,2,\ldots,N_t\}} \tilde{\rho}_{i,t}O(x_{i,t}). \tag{23}$$

The centre of the constraint $x_{j,constr}$ is set equal to the selected state $x_{sel}$. The objective function that is maximised by the procedure can be written as $$G = -\min_{i \in \{1,2,\ldots,N_{sim}\}} \min_{t \in \{1,2,\ldots,N_t\}} d_{i,t}, \tag{24}$$

where the local comparisons are defined by Eq. (22).

More generally, a sampling distribution function can be fitted to a set of states with particular small weighting factors, e.g., the centres $x_{j,1,constr}$ may be determined of the sampling distribution function of Eq. (18) with $k_{j,1,constr}$ set to negative values. For this purpose $N_{j,constr}$ states $x_{sel,s}$ with s=1, 2, ..., $N_{j,constr}$ may be selected that correspond to the minima $$\min_{i \in \{1,2,\ldots,N_{sim}\}} \min_{t \in \{1,2,\ldots,N_t\}} \left( \tilde{\rho}_{i,t} \exp\left( \sum_{l=1}^{s-1} k_{j,i,constr}(x_{i,t}-x_{sel,l})^2 \right) O(x_{i,t}) \right). \tag{25}$$

This may be done by selecting first the state $x_{sel,1}$ that corresponds to the minimum of Eq. (25) with s=1, then select the state $x_{sel,2}$ with s=2, and so on until s=$N_{j,constr}$. The centres, $x_{j,1,constr}$, of the constraint can then be set equal to the selected states, $x_{sel,1}$. This procedure maximises the objective function of Eq. (24) with the local comparisons defined as $$d_{i,t}=d(\rho_j(v_j,\tilde{x}_{i,t}),\tilde{x}_{i,t},\tilde{\rho}_{i,t}O(x_{i,t}))=\lim_{c\to\infty}\sum_{s=1}^{N_{j,constr}}\left(\frac{\rho_j(v_j,\tilde{x}_{i,t})}{\rho_{mc}(\tilde{x}_{i,t})}+\tilde{\rho}_{i,t}\exp\left(\sum_{l=1}^{s-1}k_{j,i,constr}(x_{i,t}-x_{sel,l})^2\right)O(x_{i,t})\right)c^{-l} \tag{26}$$

Fitting Procedure 3: Linear Least Square Fit.

Procedure 3 performs a linear least square optimisation to fit the vector $v_j$ of parameters of the sampling distribution function to the product $\tilde{\rho}_{i,t}|O(x_{i,t})|$. The description assumes that the sampling distribution function of Eq. (18) is used. The number of harmonic constraints, $N_{j,constr}$, and the centres, $x_{j,1,constr}$, of the harmonic constraints are determined before starting the fit. This can be done, for example, using a clustering algorithm. The strengths $k_{j,1,constr}$ of the constraints are obtained by a linear least square fit of the logarithm of the un-normalised sampling distribution function to the logarithm of the product $\tilde{\rho}_{i,t}|O(x_{i,t})|$ of the weighting factors $\tilde{\rho}_{i,t}$ times the absolute value of the function O(x). The objective function can be set equal to $$G = \sum_{i=1}^{N_{sim}} \sum_{t}^{N_t} d_{i,t}. \tag{27}$$

with local comparisons defined by $$d_{i,t}=d(\rho_j(v_j,\tilde{x}_{i,t}),\tilde{x}_{i,t},\tilde{\rho}_{i,t}O(x_{i,t}))=(\ln\ h(v_j,\tilde{x}_{i,t})-\ln(\tilde{\rho}_{i,t}|O(x_{i,t})|))^2. \tag{28}$$

The procedure may be adapted, e.g., for other sampling distribution functions.

Fitting Procedure 4: Fit to Pairs of States with Large and Small Weighting Factors, Respectively.

Procedure 4 fits the sampling distribution function to pairs of states $x_{sel1}$ and $x_{sel2}$ with the two states being dose together in the state space, and with $\tilde{\rho}_{sel1}$ being relatively small and $\tilde{\rho}_{sel2}$ being relatively large. Such a pair can be identified, for example, using the criteria of Eq. (20) to select $x_{sel2}$, and then select the state closest to it as $x_{sel1}$. An alternative is to select states generated in subsequent time steps with a Metropolis Monte Carlo Version 1, or a stochastic dynamics algorithm. The selected states are then used to define a bias away from $x_{sel1}$ into the region around $x_{sel2}$, e.g., use the sampling distribution function of Eq. (16) with $x_{j,constr}=x_{sel2}+c(x_{sel2}-x_{sel1})$, where c is a constant.

The objective function maximised by this procedure is the same as the one maximised by procedure 1, except that the state at which to evaluate the sampling distribution function should be defined as $\tilde{x}_{i,t}=x_{i,t}+c(x_{i,t}-x_{i,t,close})$, where $x_{i,t,close}$ denotes the state from the sampled states that is closest to $x_{i,t}$.

Sampling of Conformations of Molecules

Sampling molecular conformations is one of the main applications of molecular dynamics simulations. Examples are peptide and protein folding simulations, in which the conformational space of a peptide or protein is investigated with the aim of identifying conformations that are stable under native conditions, or drug binding studies with the aim of identifying and characterising binding modes of drug candidates to their host proteins. As an example, the following description describes how to apply the patent to the protein folding problem.

Step 1. Perform a short molecular dynamics simulated annealing (S. Kirkpatrick, C. D. Gelatt Jr., M. P. Vecchi, "Optimization by Simulated Annealing", Science, 220, 4598, (1983) 671-680.) run starting from an extended conformation. The conformation, $x_{anneal}$, resulting from the annealing run is used as the starting state of the simulation when executing step 2 for the first time. In the first simulation, the system is restrained to the region around $x_{anneal}$, i.e., the sampling distribution function of Eq. (15) is used with $x_{1,constr}=x_{anneal}$. The parameter $k_{constr}$ that determines the strength of the harmonic constraint is set to a positive value that can be set based on a set of preliminary test runs.

Step 2. Carry through a molecular dynamics simulation starting with the selected starting state (conformer), and the selected sampling distribution function $\rho_j(x)$.

Step 3.1. The weighting factors $\tilde{\rho}_{i,t}$ are determined with Eqs. (8-10).

Step 3.2. Fitting Procedure 1 is used to fit the sampling distribution function of Eq. (16). A single property is used to define the function O(x) with Eq. (19) and to select a state with Eq. (20). The property is set equal to the inverse of the probability distribution of the energies of the system. The probability distribution of the energies is estimated using Eq. (5) based on the energies of the sampled conformations $x_{i,t}$ and their weighting factors $\tilde{\rho}_{i,t}$. The property is large for conformations with energies that are unlikely in the unbiased system, and it is small for conformations with energies that are likely in the unbiased system. Using this property in Eq. (19) ensures that states are selected regardless of their energy, provided they are in a region that was relatively little sampled in previous simulations. Depending on the system, additional properties could be included in the set $\Theta$ of properties used to define the function O(x). For example, for drug binding studies, the additional property might be set equal to the inverse of the probability distribution of the position of the drug candidate relative to the protein. This would ensure that different possible positions of the drug relative to the protein are sampled.

Step 4. Make 200 iterations of steps 2 to 4.

Step 5. Determine the weighting factors $\tilde{\rho}_{i,t}$. Use the weighting factors to estimate properties, e.g., the free energy as a function of the temperature, or the probability distribution of the radius of gyration at a selected temperature.

Two-Dimensional HP Protein-Folding Model

Figure 5:
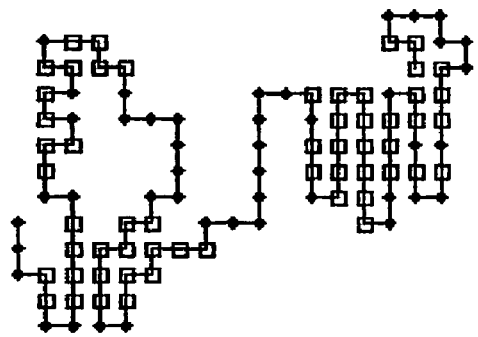
FIG. 5. is an example of a conformation of the two-dimensional HP protein-folding model.

This section applies the invention to study the two-dimensional HP protein-folding model, and compares it to simulated annealing and to multicanonical sampling. The conformational space is investigated of a chain consisting of 100 hydrophobic H and polar P monomers. The chain moves on a two-dimensional grid. The chain is self-avoiding, i.e., no two monomers may occupy the same grid point. If two H monomers are in contact, they interact favourably giving an energy contribution of −2. There are no other interactions. The probability distribution of the system is set equal to $\rho(x)=\exp(-E(x)/2)$ where E(x) is the energy function. The probability distribution is not normalised. A Metropolis Monte Carlo algorithm is used to sample conformations of the chain. The Metropolis Monte Carlo algorithm uses a set of simple moves to change the conformation of the chain locally, one or two monomers per move. The same set of moves is used in all the simulations, and no attempts were made to optimise the set of Monte Carlo moves. FIG. 5 shows a conformation. Hydrophobic H monomers that interact favourably if in contact are drawn as empty rectangles; polar P monomers are drawn as filled circles.

To study the conformational space using simple enumeration, some $1.7*10^{47}$ conformations would have to be generated, which is beyond the capabilities of computers. The examples presented in this study change the conformaton $3*10^8$ times. The required calculations take a few hours on a personal computer. The properties that are assumed to be of interest and that are subsequently analysed are low energy states, states with small radii, the probability of states as function of the energy and as a function of the radius. The first two properties illustrate global optimisations; the latter two properties illustrate state space integrals.

The procedure used to study the folding of the grid model is similar to the one described above for the protein folding simulations. In particular, a sampling distribution function similar to the distribution function of Eq. (16) is used that applies a local constraint, and the sampling distribution function is fitted using fitting procedure 1. In more detail: the constraining potential is defined based on the radius of gyration and on a comparison of the monomer contacts present in the current conformation x and the conformation selected by the fitting process $x_{sel}$. I.e., the sampling distribution function is set equal to $$\rho_j(x)=f_j\exp(-k_1(n_{formed}(x)+n_{broken}(x))^2-k_2|R_{gyr}(x)-R_{ref}|)\rho_{mc}(x). \quad (29)$$

In Eq. (29), $n_{formed}(x)$ is equal to the number of monomer contacts formed in the current conformation x that are not present in $x_{sel}$, $n_{broken}(x)$ is equal to the number of monomer contacts of $x_{sel}$ that are no more present in the current conformation x. $R_{gyr}(x)$ is the radius of gyration of conformation x, and $R_{ref}$ is set equal to the radius of gyration of $x_{sel}$. Since a Metropolis Monte Carlo algorithm (version 1) is used to generate the conformations, the normalisation constant $f_j$ in Eq. (29) needs not to be known. The constants $k_1$ and $k_2$ are set equal to 0.003 and 0.5, respectively. The constants were determined in a series of test runs.

For the simulations (step 2), a simple Metropolis Monte Carlo algorithm (version 1) is used. The Monte Carlo algorithm generates new, conformations by randomly changing the position of a single monomer or two adjacent monomers at a time. New conformations are accepted or rejected using the criterion of Eq. (6). A single run of the simulation algorithm in step 2, consists of 3,000,000 Monte Carlo moves. The first 500,000 moves are considered as equilibration phase, and are not used. Then, 50 conformations are taken every 50,000 moves. This results in 50 conformations $x_{j,t}$ for each of the simulations j. 100 simulations are carried out. Thus, a total of $3*10^8$ states are generated, of which 5,000 are used for the analysis, e.g., to fit the sampling distribution functions in step 3.

Two properties are used to define the function O(x) with Eq. (19) and to fit the sampling distribution function using procedure 1. The first property is the inverse of the probability distribution of the energies of the system. The probability distribution of the energies is estimated using Eq. (5) based on the energies of the sampled conformations $x_{i,t}$ and their weighting factors $\tilde{\rho}_{i,t}$. The property is large for conformations with energies that are unlikely in the unbiased system described by $\rho(x)$, and it is small for conformations with energies that are likely in the unbiased system. The property ensures that states are selected regardless of their energy, if they are in a region that was little sampled in previous simulations.

The second property used in Eq. (19) is the inverse of the probability distribution of the radius of gyration of the system. This property ensures that states are selected regardless of their radius of gyration, if they are in a region that was little sampled in previous simulations. The selection of the properties to use for the fitting procedure is compatible with the set of properties that are assumed to be of interest (low energy states, states with small radii, the probability of states as function of the energy and as a function of the radius; see above).

Figure 6:
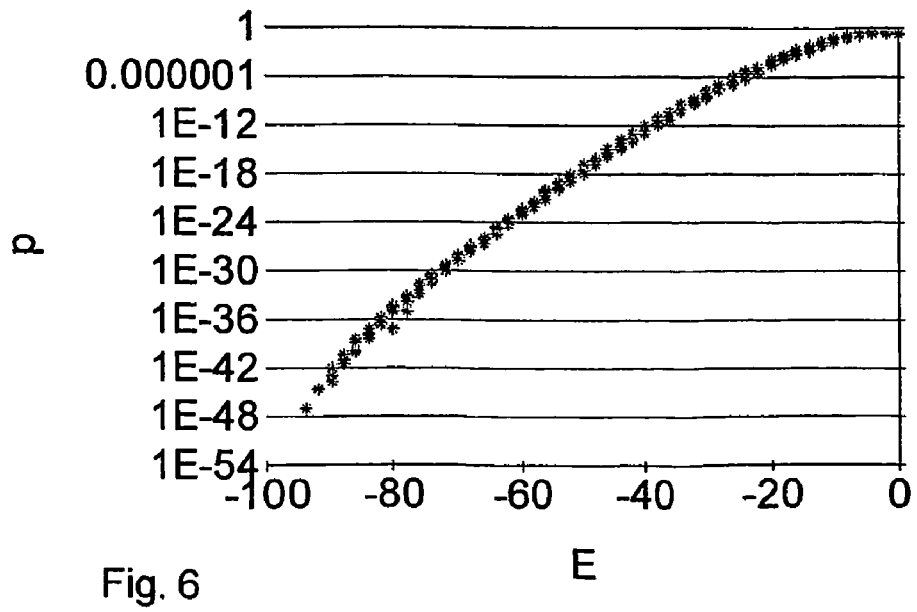
FIG. 6. shows estimates of the probability (p) of states with a given energy (E) for the HP protein-folding model.

Results from five independent test runs are analysed. FIG. 6 plots the probability of states as a function of the energy. The agreement between the results of the different runs is good. Some differences exist for the estimates of the probabilities of states with low energies. The differences in the estimates suggest that there exist different kinds of low energy states, and that the runs differ in the set of low energy states sampled. Low energy conformations with energies around −90 are rare, i.e., they are estimated to occur with a probability of about $10^{-45}$.

Figure 7:
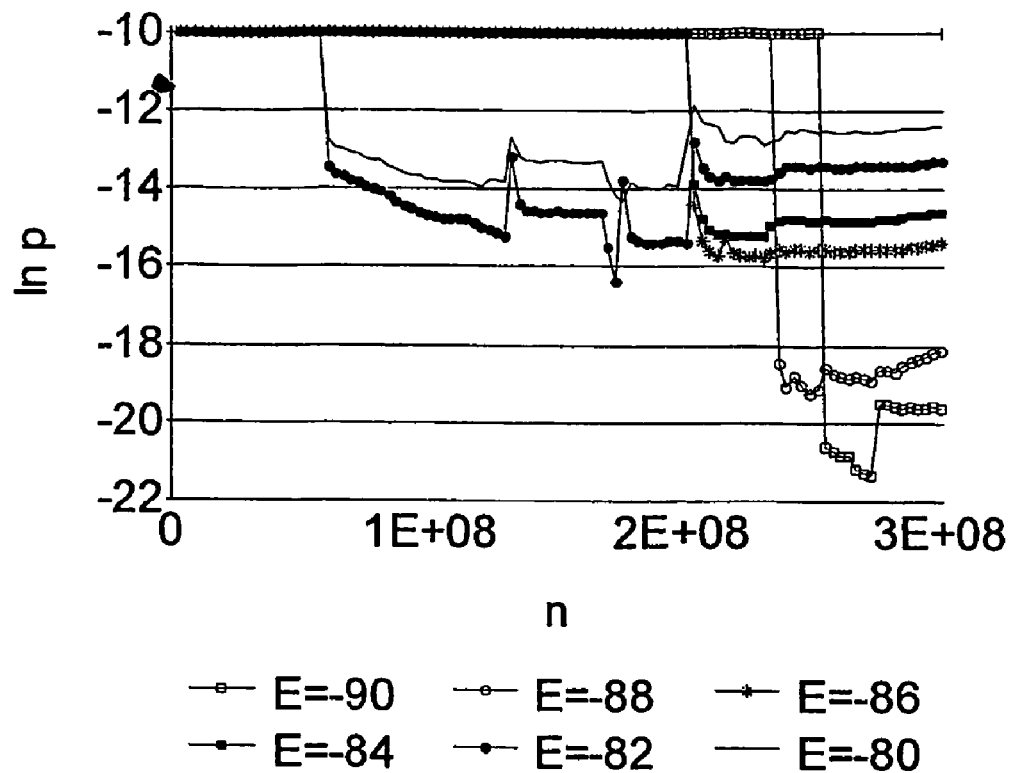
FIG. 7. shows estimates of the probability of states with energy −92, −90, −88, −86, −84 and −82 as a function of the number of states that were sampled for the HP protein-folding model.

FIG. 7 illustrates the convergence of the estimates of the probability of low energy states from FIG. 6. Shown are the estimates of the probability as a function of the progress of the simulation. Low energy conformations are rare, and finding them is difficult. They are found only after some initial sampling that explores the state space. Once, a first state with given energy has been found, the estimate of the probability converges rapidly, and does remain stable over the rest of the run.

Figure 8:
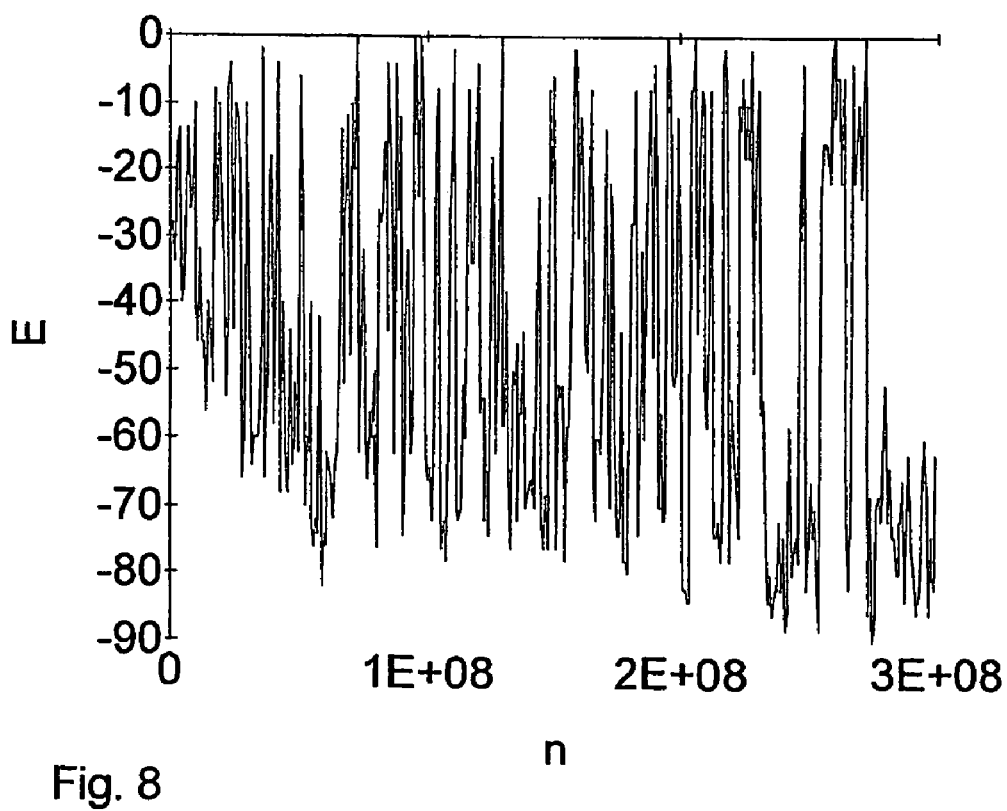
FIG. 8. shows energies (E) of states sampled in test run B as a function of the number of states (n) that were sampled.

FIG. 8 plots the energy of the states from Run B as a function of the progress of the run. The run starts by sampling high energy states. As the run progresses, it finds states of increasingly low energy. The system gets never trapped. After having found a state of low energy, the run continues by sampling new regions of the state space, and eventually finds a new low energy state.

Figure 9:
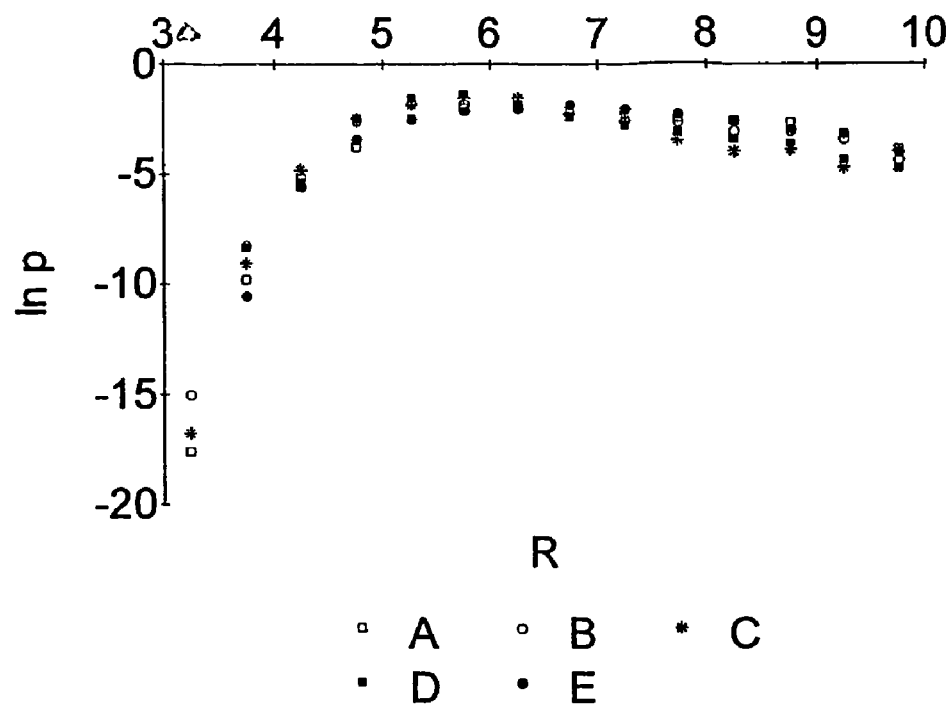
FIG. 9. shows estimates of the probability of states (In p) with given radius (R) for runs A, B, C, D and E.

FIG. 9 shows estimates of the radius distribution of states. The estimates from the different runs are all smooth functions and agree quantitatively.

Comparison with the State of the Art

In summary, the five runs are successful in identifying low energy and compact states, and give quantitative estimates of the probability of the energy of states and of the radii of states. The five test runs are compared to five simulated annealing runs and to five runs of multicanonical sampling. The same Metropolis Monte Carlo algorithm is used in all the runs, and, as in the test runs, the conformations are updated $3*10^8$ times. In the simulated annealing run (S. Kirkpatrick, C. D. Gelatt Jr., M. P. Vecchi, "Optimization by Simulated Annealing", *Science*, 220, 4598, (1983) 671-680.), the temperature is lowered linearly in 5000 steps from 1.5 to 0.5. In the multicanonical runs (Bernd A. Berg and Thomas Neuhaus "Multicanonical ensemble: A new approach to simulate first-order phase transitions", *Phys. Rev. Let.* 68 (1992), 9-12.), the umbrella potential is updated 100 times.

Table 1 compares the runs with respect to their performance for the optimisation problem "find low energy states". The lowest energy found in different runs varies between −80, and −94. From all the runs, the test runs with the present invention identify the best state (energy of −94). In average, the test runs find states with an energy of −88. This compares favourably to the average of −86.4 from the multicanonical runs, and to the average of −83.6 from the simulated annealing runs.

TABLE 1

Lowest energies found in each of the runs. Data is shown for the five test runs (Test), the five multicanonical or adaptive umbrella sampling runs (Adumb), and the five simulated annealing runs (Annealing).

| Min Score | Run A | Run B | Run C | Run D | Run E |
|---|---|---|---|---|---|
| Adumb | −86 | −86 | −86 | −86 | −88 |
| Annealing | −86 | −88 | −84 | −80 | −80 |
| Test | −86 | −90 | −90 | −80 | −94 |

Figure 10:
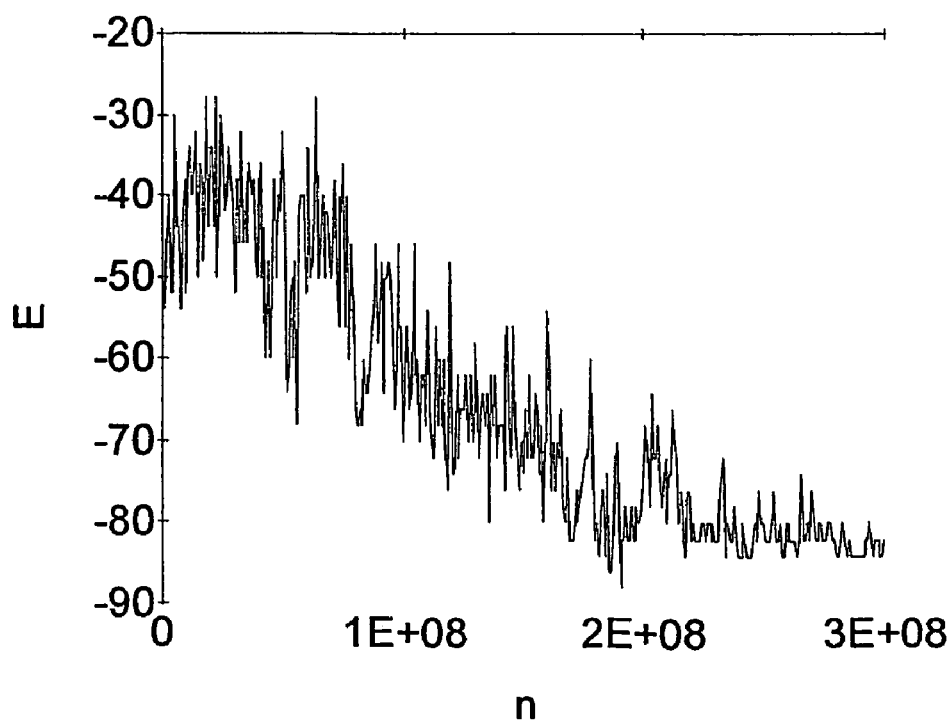
FIG. 10. shows energies (E) of states sampled in the simulated annealing run B as a function of the number of states (n) that were sampled.

Runs with the present invention do not get trapped (see FIG. 8). This is different from the situation with simulated annealing and multicanonical simulations. In simulated annealing runs (see FIG. 10), the simulations start at a high temperature at which transitions between different regions occur frequently. As the temperature is lowered, sampling is increasingly restricted to a region around a low energy state. If different regions with comparable low energies exist—as in the present system—several simulated annealing runs are required to identify the different regions.

Figure 11:
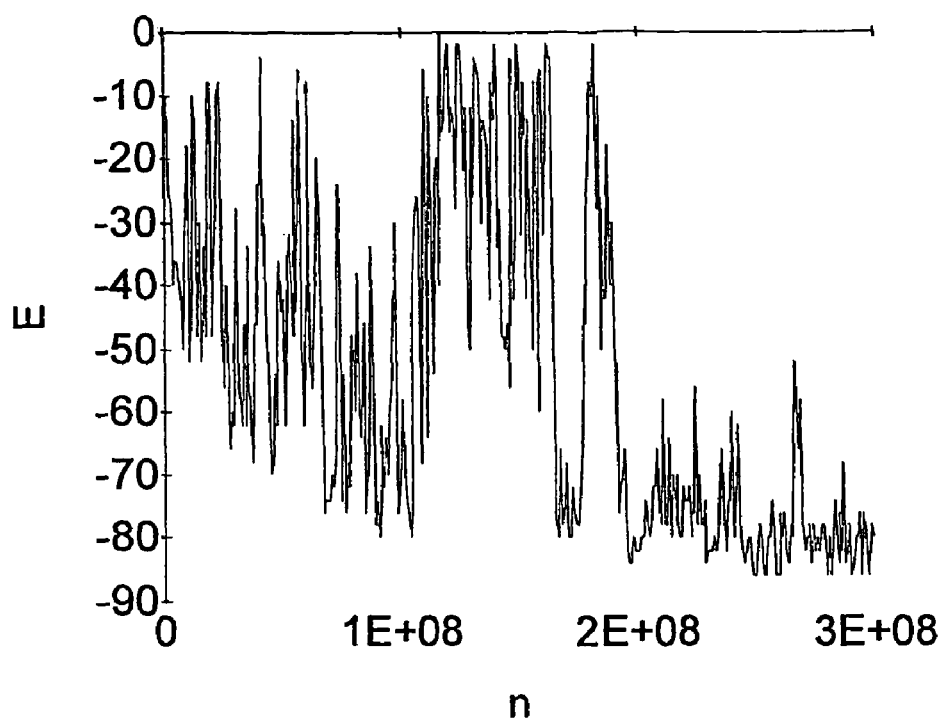
FIG. 11. shows energies (E) of states sampled in the multicanonical (Adumb) run B as a function of the number of states (n) that were sampled.

Multicanonical simulations of high dimensional system have the tendency to get trapped (FIG. 11) close to the first low energy state found. Although multicanonical simulations should guarantee that low and high energy states are sampled with comparable probability, they cannot guarantee that transitions between the different regions occur frequently.

Figure 12:
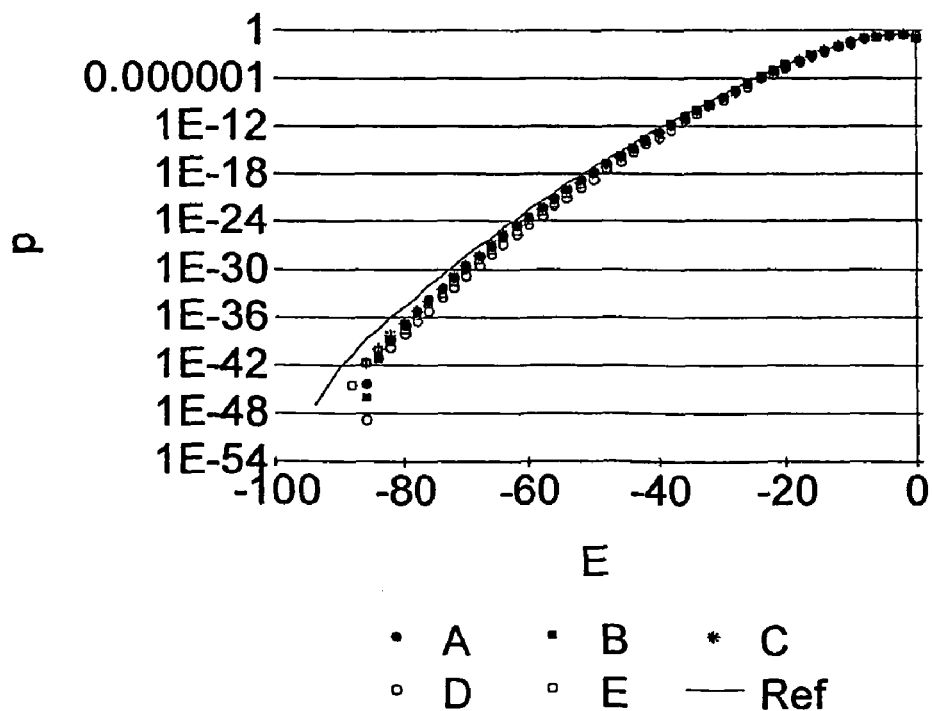
FIG. 12. shows estimates of the probability (p) of states with a given energy (E). Estimates obtained from the five multicanonical (Adumb) runs A, B, C, D, E and the average of the test runs from FIG. 6 Ref.

FIG. 12 shows estimates of the probability of states with given energy from the multicanonical runs and compares them to the corresponding estimates from the test runs (FIG. 6). The average of the estimates from the test runs is shown as continuous line in FIG. 12. The estimates from all the runs agree in general. The estimates for high-energy states agree well. Some differences are evident at low energies. At low energies, the probabilities estimated from the test runs are larger than those from the multicanonical runs. This indicates that the test runs find more low energy states.

The simulated annealing runs are irrelevant in such a comparison of equilibrium properties of the system, since no method has so far been described to derive converged state space integrals from simulated annealing runs.

Value at Risk of a Financial Portfolio

The value at risk of a financial portfolio gives an estimate of the future value of a financial portfolio in adverse market situations. It is equal to a percentile of the probability distribution of the future value of the portfolio. E.g., the 99% value at risk is equal to the future value of the portfolio that separates the worst 1% from the best 99% of the possible future values of the portfolio. Efficient estimation of the value at risk is challenging since it requires sampling of a few rare state, i.e., particular adverse market situations, and the location of the rare states is, in general, not known before staring the simulations and must be found.

Step 1. Select the distribution function of the (unbiased) system as the initial sampling distribution function, i.e., $\rho_1(x) \equiv \rho(x)$. A Monte Carlo algorithm is used for the simulations. The Monte Carlo algorithm produces states independently of any starting state. Thus, no starting state is needed. A Monte Carlo algorithm must exist to produce un-correlated states distributed according to $\rho_1(x)$. This restricts the set of sampling distribution functions that can be used.

Step 2. Carry through a Monte Carlo simulation using the selected sampling distribution function $\tilde{\rho}_j(x)$.

Step 3.1. The weighting factors $\tilde{\rho}_{i,t}$ can be determined with Eqs. (8) and (10). The normalisation constants $\tilde{f}_k^{self}$ are known and need not to be determined with Eq. (9)

Step 3.2. Fitting Procedure 1 is used to fit the sampling distribution function of Eq. (15). A single property is used to define the function $O(x)$ with Eq. (19) and to select a state with Eq. (20). The property is defined as follows. First, determine a limit identifying large losses, e.g., losses that occur with a probability of less than 10%. Then, set the property equal to a function that is 0 for small losses and 1 for large losses.

Step 4. Make 200 iterations of steps 2 to 4.

Step 5. Estimate the weighting factors $\tilde{\rho}_{i,t}$. Use the weighting factors to determine the probability distribution of the value of the portfolio, and determine the value at risk.

An alternative would be to use the sampling distribution function defined by Eq. (18), the Metropolis Monte Carlo Version 2 algorithm, and the fitting procedures 2 or 3.

The invention claimed is:

1. A method for sampling a state space of a system with states x and a probability density $\rho(x)$ indicating the probability for the system to be in state x by iteratively generating states xi,t and their weighting factors ρi,t, wherein the index i is the iteration parameter and the index t distinguishes different states xi,t generated by an iteration i, the method comprising:
   sampling the state space of the system and performing,
      a first step for selecting an initial sampling distribution function ρi(x), to execute an iteration procedure including:
      a second step for generating Nj states xj,t by a numerical sampling algorithm,
      a third step determining weighting factors ρi,t for states xi,t generated so far by using sampling distribution functions ρi(x) determined so far,
      a fitting step for determining a sampling distribution function ρj(x) for the next iteration by fitting ρj(x) to ρi,tO(xi,t) for states xi,t generated so far, wherein O(xi,t) is a function, respectively a property of the states xi,t,
      identifying a desired property in the state space of the system based on sampled state space, and
      a fourth step for testing at least one criterion to decide whether to continue the iteration procedure or to stop the iteration procedure and to go to a fifth step for performing an analysis using simulated data.

2. Method as claimed in claim 1, wherein the sampling distribution function $\rho_j(x)$ of at least one iteration is fitted such that it maximizes an objective function preferably defined as a function of local comparisons between the sampling distribution function and the product $\tilde{\rho}_{i,t}O(x_{i,t})$.

3. Method as claimed in claim 1, wherein the sampling distribution function $\rho_j(x)$ of at least one iteration is fitted such that the sampling distribution function $\tilde{\rho}_j(x)$ is large for at least one state $x_{i,t}$ with a large product $\tilde{\rho}_{i,t}O(x_{i,t})$, and tends to be small for states with a small product $\tilde{\rho}_{i,t}O(x_{i,t})$.

4. Method as claimed in claim 1, wherein the sampling distribution function $\rho_j(x)$ of at least one iteration is a function with at least one constraint.

5. Method as claimed in claim 4, wherein the sampling distribution function $\rho_j(x)$ of at least one iteration is the distribution function of the system with constraints or a multicanonical distribution function with constraints.

6. Method as claimed in claim 1, wherein the numerical sampling algorithm of at least one iteration generates correlated states $x_{j,t}$.

7. Method as claimed in claim 4, wherein the fitting of $\rho_j(x)$ is done by selecting states $x_{i,t}$ for which the product $\tilde{\rho}_{i,t}O(x_{i,t})$ has extreme values and by using the selected states $x^{i,t}$ to define the region in which $\rho_j(x)$ has extreme values.

8. Method as claimed in claim 1, wherein parameters of the sampling distribution function $\rho_j(x)$ of at least one iteration are determined by a linear least square fit of the logarithm of the un-normalized sampling distribution function $\rho_j(x)$ to the logarithm of the product $\tilde{\rho}_{i,t}O(x_{i,t})$.

9. Method as claimed in claim 1, wherein the normalization constant of the sampling distribution function $\rho_j(x)$ of at least one iteration is estimated from the sampled states $x_{i,t}$ and their weighting factors $\tilde{\rho}_{i,t}$.

10. Method as claimed in claim 1, wherein at least three iterations are done.

11. Method as claimed in claim 1, wherein the function $O(x)$ is a function of a set of at least two functions $\Theta = \{O_1(x), O_2(x), \ldots, O_{Nprop}(x)\}$.

12. A computer readable storage medium encoded with a computer program including instructions for sampling a state space by iteratively generating states xi,t and their weighting factors ρi,t, wherein the index i is the iteration parameter and the index t distinguishes different states xi,t generated by an iteration i, which instructions, when read by a computer enable the computer to:
   select an initial sampling distribution function ρi(x),
   to execute an iteration procedure including:
      generating Nj states xj,t by a numerical sampling algorithm,
      determining weighting factors ρi,t for states xi,t generated so far by using sampling distribution functions ρi(x) determined so far,
      a fitting step for determining a sampling distribution function ρj(x) for the next iteration by fitting ρj(x) to ρi,tO(xi,t) for states xi,t generated so far, wherein O(xi,t) is a function, respectively a property of the states xi,t,
      identifying a desired property in the state space of the system based on sampled state space, and
      testing at least one criterion to decide whether to continue the iteration procedure or to stop the iteration procedure and to perform an analysis procedure using simulated data.

13. Method as claimed in claim 2, wherein the sampling distribution function $\rho_j(x)$ of at least one iteration is fitted such that the sampling distribution function $\tilde{\rho}_j(x)$ is large for at least one state $x_{i,t}$ with a large product $\tilde{\rho}_{i,t}O(x_{i,t})$, and tends to be small for states with a small product $\tilde{\rho}_{i,t}O(x_{i,t})$.

14. Method as claimed in claim 1, wherein the sampling distribution function $\rho_j(x)$ of at least one iteration is a function with at least one constraint, having an extreme value in the region of at least one selected state $x_{j,constr}$ and having vanishing values at a distance from the at least one selected state $X_{j,constr}$.

15. Method as claimed in claim 1, wherein the sampling distribution function $\rho_j(x)$ of at least one iteration is a function with at least one constraint, having an extreme value in the region of at least one selected state $x_{j,constr}$ and having vanishing values at a distance from the at least one selected state $x_{j,constr}$, wherein the constraint is a harmonic constraint with at least one constant $k_{constr}$ defining the strength of the constraint at the selected state $x_{j,constr}$.

16. Method as claimed in claim 1, wherein the numerical sampling algorithm of at least one iteration generates correlated states $x_{j,t}$, wherein the sampling distribution function $\rho_j(x)$ has a maximum that biases sampling into a sub-region of the state space, wherein the sampling distribution function $\rho_j(x)$ is fitted such that the maximum is in a region where the product $\tilde{\rho}_{i,t} O(x_{i,t})$ has a maximum, and wherein the sampling starts from a state close to the maximum of the sampling distribution function $\rho_j(x)$.

17. Method as claimed in claim 1, wherein the function $O(x)$ is a function of a set of at least two functions $\Theta = \{O_1(x), O_2(x), \ldots, O_{Nprop}(x)\}$, including at least one of the following functions:
- at least one property for which at least one estimate is derived in the analysis of the fifth step,
- at least one function that is large for states that must be sampled to ensure transitions between important regions,
- the inverse of the probability distribution function of at least one property of the system, and
- the inverse of the probability distribution of the negative logarithm of the distribution function of the system.

18. A computer-readable storage medium comprising executable program instructions configured to cause a computer to perform the method of claim 1.

* * * * *